United States Patent [19]

Fleischer et al.

[11] 4,186,381

[45] Jan. 29, 1980

[54] GASOLINE STATION REGISTRATION AND CONTROL SYSTEM

[75] Inventors: Donald W. Fleischer, Wethersfield; Richard E. Peruggi, Glastonbury, both of Conn.

[73] Assignee: Veeder Industries Inc., Hartford, Conn.

[21] Appl. No.: 927,578

[22] Filed: Jul. 24, 1978

[51] Int. Cl.$^2$ ........................ H04Q 9/00; G06F 15/56; B67D 5/08; G07F 13/00

[52] U.S. Cl. ........................ 340/152 R; 235/92 FL; 222/76; 364/465

[58] Field of Search ........................ 340/150-152, 340/147 A; 364/479, 465; 222/26, 30, 76; 235/92 FL

[56] References Cited

U.S. PATENT DOCUMENTS

| | | | |
|---|---|---|---|
| 3,878,377 | 4/1975 | Brunone | 222/26 X |
| 3,897,887 | 8/1975 | Goldberg | 340/151 X |
| 3,927,800 | 12/1975 | Zinsmeyer et al. | 340/150 X |
| 3,984,032 | 10/1976 | Hyde et al. | 340/151 X |
| 4,034,193 | 7/1977 | Jackson | 364/465 |
| 4,107,777 | 8/1978 | Pearson et al. | 364/465 |

*Primary Examiner*—Donald J. Yusko

*Attorney, Agent, or Firm*—Prutzman, Kalb, Chilton & Alix

[57] ABSTRACT

A gasoline station with self-service and attendant operated pumps and a fuel delivery control and registration system with a fixed remote control unit operable for selectively activating each self-service pump and registering the amount of fuel delivered and a portable control unit for operating the fixed control unit and registering the amount of fuel delivered via two-way radio communication between the portable and fixed control units.

8 Claims, 3 Drawing Figures

GASOLINE STATION REGISTRATION AND CONTROL SYSTEM

BRIEF SUMMARY OF THE INVENTION

The present invention relates to fuel delivery control and registration systems having notable utility with hybrid gasoline stations having both self-service and attendant operated gasoline pumps for individually controlling and registering the fuel deliveries at each self-service fuel pump while providing attendant operation of the attendant operated fuel pumps.

It is a primary aim of the present invention to provide a new and improved fuel delivery control and registration system which facilitates attendant operation of one or more fuel pumps while the attendant controls the self-service deliveries of fuel from a plurality of self-service fuel pumps and charges each self-service customer for the fuel delivered.

It is another aim of the present invention to provide a new and improved fuel delivery control and registration system having both fixed and portable control and registration stations and notably useful with hybrid self-service gasoline stations having both attendant and self-service gasoline pump operation.

It is a further aim of the present invention to provide a new and improved fuel delivery control and registration system which provides improved flexibility in remotely controlling and registering the cost and/or volume amount of each self-service fuel delivery from a self-service gasoline station.

It is another aim of the present invention to provide a new and improved gasoline station delivery control and registration system which is operable by one or more gasoline station attendants for controlling and registering the self-service fuel deliveries from a large number of fuel delivery pumps while providing attendant delivery at one or more gasoline pumps and/or attendant services.

It is a further aim of the present invention to provide a new and improved gasoline pump delivery registration system for registering at a remote location the cost and/or volume amounts of a gasoline delivery from each of a plurality of fuel pumps.

It is another aim of the present invention to provide a new and improved self-service gasoline station delivery control and registration system which provides control and registration of each gasoline pump delivery at a central pay station and also remotely at the place of work of a service station attendant or other employee.

Other objects will be in part obvious and in part pointed out more in detail hereinafter.

A better understanding of the invention will be obtained from the following detailed description and the accompanying drawings of an illustrative application of the invention.

DESCRIPTION OF THE PREFERRED EMBODIMENT

Figure 1:
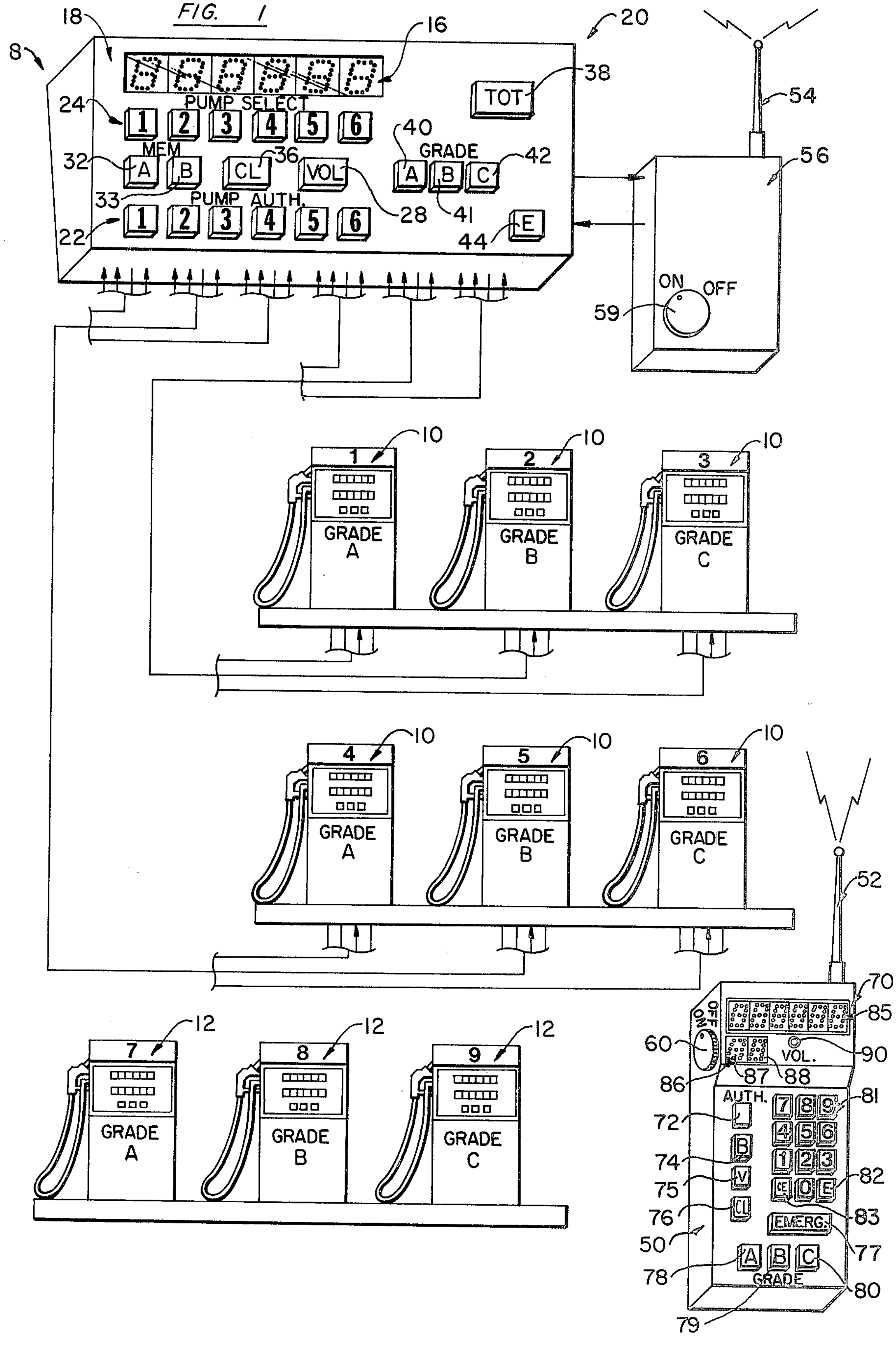
FIG. 1 is a generally diagrammatic view of a hybrid gasoline station having self-service and attendant operated pumps and employing an embodiment of a fuel delivery registration and control system of the present invention.

Referring now to the drawings in detail, wherein like numerals represent like parts, an embodiment of a gasoline station delivery control and registration system 8 incorporating the present invention is shown employed in a hybrid gasoline station having six generally conventional self-service fuel pumps or dispensers 10 which are remotely controlled as hereinafter described and three generally conventional attendant operated fuel pumps or dispensers 12 which, in the shown hybrid gasoline station, are not connected to be remotely controlled for self-service operation.

The fluid delivery control and registration system 8 comprises a plurality of manually operable controls and a display register 16 for selectively displaying the cost and volume of each fuel delivery from the six self-service pumps 10 and the total volume and total cost of each of three grades of fuel, herein designated grades A, B and C, adapted to be delivered from the six self-service pumps 10. The display register 16 and the manually operable controls are preferably provided as a remote control station console 18 (forming part of a remote fixed station module 20), and in a conventional manner the console 18 is preferably remotely located at a central pay station to permit a console operator to view a dispensing operation at each of the self-service pumps 10 as well as to control and register each delivery. The remote console 18 has primary utility in providing for self-service delivery of gasoline from each self-service pump 10 and such that each self-service customer can handle his own gasoline delivery after appropriate authorization is given by the remote console operator and pay the console operator after the delivery. Although not provided in the shown system, the control system may be designed for both postpay and prepay capabilities and so that when it is used in its prepay mode, the control system would provide for automatically terminating a fuel delivery after a prepaid cost amount of fuel is delivered.

For simplifying the description of the present invention, the postpay console 18 is a six pump console of the type shown and described in U.S. Pat. No. 3,878,377 of Peter P. Brunone, dated Apr. 15, 1975 and entitled "Fluid Delivery Control and Registration System". Therefore, the postpay console 18 is not shown or described in detail and only the features of the examplary embodiment of the present invention are described in detail. Thus, reference should be made to U.S. Pat. No. 3,878,377 for the details of the control and registration circuitry of the remote postpay console 18, its connection to each self-service fuel pump 10 and the system and operation of each self-service fuel pump 10.

Briefly however, the console 18 comprises a bank of six pump authorization push button switches 22 for authorizing fuel deliveries from the six self-service pumps 10 and a bank of six pump readout push button switches 24 for displaying with the six digit display register 16 the cost or volume amount of gasoline dispensed at the selected self-service pump 10 (the cost amount being displayed unless a volume select button 28 is depressed). Each authorization push button switch 22 is lighted continuously when the corresponding pump is authorized and intermittently when a self-service customer presses a switch button (not shown) at the pump to request authorization.

The console 18 has a computer memory (not shown) with "A" and "B" memory sections for each self-service pump 10 for storing two separate fuel deliveries from the pump. "A" and "B" memory select push button switches 32, 33 respectively are provided for selectively displaying with the display register 16, the deliveries stored in the "A" and "B" memory sections. Also, a clear push button switch 36 is provided for clearing the pump memory section currently displayed by the register 16. Each memory push button switch 32, 33 has a lamp which is lighted continuously to signal when a corresponding fuel delivery from the selected pump is completed and which is turned off when the memory section is cleared with the clear push button switch 36. A totalizer push button switch 38 and "A", "B", and "C" grade select push button switches 40-42 are provided for independently registering the total amount delivered of each of the three fuel grades or products (designated "A", "B", and "C") which are available. Finally, an emergency push button switch 44 is provided for deactivating all of the self-service pumps 10.

The self-service pumps 10 are therefore connected for customer self-service operation through remote control of each pump from a central postpay station where the console 18 is located. Also, as indicated, three additional non-self-service pumps 12 are provided which are not constructed and connected for self-service operation and which are intended for operation by a station attendant in a conventional manner.

In accordance with the present invention, the delivery registration and control system 8 employs a portable preferably pocket-size remote control module 50 adapted to be hand carried by a station attendant while he is delivering fuel at the attendant operated gasoline pumps 12 and providing attendant services to self-service customers and/or other customers. The portable control console 50 comprises a transmitter/receiver 52 (FIG. 3). A second transmitter/receiver 54 (FIG. 2) is provided by an interface module 56 located at the postpay station and connected to the fixed control console 18. The two transmitter/receivers 52, 54 provide two-way wireless RF communication between the portable module 50 and the fixed control console 18, preferably using a single carrier frequency. The interface module 56 and the portable control module 50 have respective on-off knobs 59, 60 and whereby when the knobs 59, 60 are turned to their "on" positions, a two-way radio communication system is activated to permit the portable control module 50 to communicate with the fixed console 18 as hereinafter described.

The portable control module 50 has a display register 70 and a number of manually operable push button switches, most of which generally functionally correspond to manually operable push button switches on the fixed postpay console 18. More particularly, the portable module 50 has a single pump authorization push button switch 72 (which corresponds to the bank 22 of authorization push button switches of the console 18); a "B" memory select push button switch 74 (the "A" memory being automatically selected if the "B" switch 74 is not operated); a volume select push button switch 75; a clear select push button switch 76; an emergency select push button switch 77; "A"; "B", and "C" grade select push button switches 78–80; and a full 0–9 numeral keyboard 81 for individually selecting each available self-service pump. Also, the portable module 50 has entry select and clear-entry select push button switches 82, 83 respectively for selectively transmitting and erasing the body of a message previously manually entered via the other push button switches.

The display register 70 comprises a six-digit cost/volume readout register 85 (which corresponds to the six-digit display or readout register 16), a two-digit display register 86 for registering the number of the selected pump (i.e., by the numerals "1" to "6") or the selected fuel grade (i.e., by the letters "A", "b" or "C") with the left-hand display indicator 87 and for registering the status of the selected pump, as hereinafter described, with the right-hand display indicator 88. A volume LED indicator light 90 indicates when the display register 85 is operated to display a volume amount. The display register 85 displays the cost or volume amount of a selected pump delivery with its five lower order digit indicators, and its left-hand or highest order digit indicator is employed to designate by the letter "A" or "b" the selected pump memory. All six digits of the display register 85 are employed for displaying the volume or cost amount of a selected grade.

The single digit status indicator 88 indicates the status of the selected pump memory; by the letter "A" to indicate that the selected pump has been authorized (and the selected pump memory is clear or currently in use); by the letter "C" to indicate that the delivery stored in the selected pump memory is awaiting clearance (i.e., the selected pump has been turned off by the self-service customer at the completion of a fuel delivery and the selected pump memory is not clear); and by a blank indicator to indicate that the selected pump memory is clear (each pump memory being normally cleared when the corresponding fuel delivery is paid for) and the selected pump has not been authorized.

Messages are transmitted from the portable module 50 to the fixed or central station module 20 (when the entry select push button switch 82 is actuated) and vice versa with a message format that comprises in succession (a) a preamble code, (b) an identification or security code, (c) an encoded message body, and (d) a redundancy code. The entire message is transmitted serially in binary form by pulse width modulation with relatively short (e.g., 0.2 to 0.4 millisecond) and relatively long (e.g., 2.0 to 3.6 millisecond) binary pulses having a constant (e.g., 4 millisecond) spacing. The preamble code of the message preferably comprises a predetermined series of pulses which, upon receipt of the transmitter/receiver 52 or 54 as the case may be operates a control and timing circuit 136 or 137 respectively to synchronize the receiving module for receiving the succeeding segments of the message. An identification or security code is employed to prevent receiving stray "messages" from unknown or unauthorized sources, and different incompatible identification codes are preferably employed at different gasoline stations in the same region. The redundancy code is provided for verifying the accuracy and completeness of the message received.

The body of each message transmitted by the portable module 50 comprises a selected pump and memory or a selected product grade, and/or a control function entered by the clear, volume, emergency and authorization select push button switches. As hereinafter more fully described, the contents of the body of each reply message transmitted by the fixed station module 93 is dependent on the contents of the interrogation or control message received from the portable module 50 and includes a feedback message portion of the message received from the portable module 50 plus (a) the status of any pump memory selected and (b) the registered cost or volume amount of any pump memory or grade selected.

Figure 2:
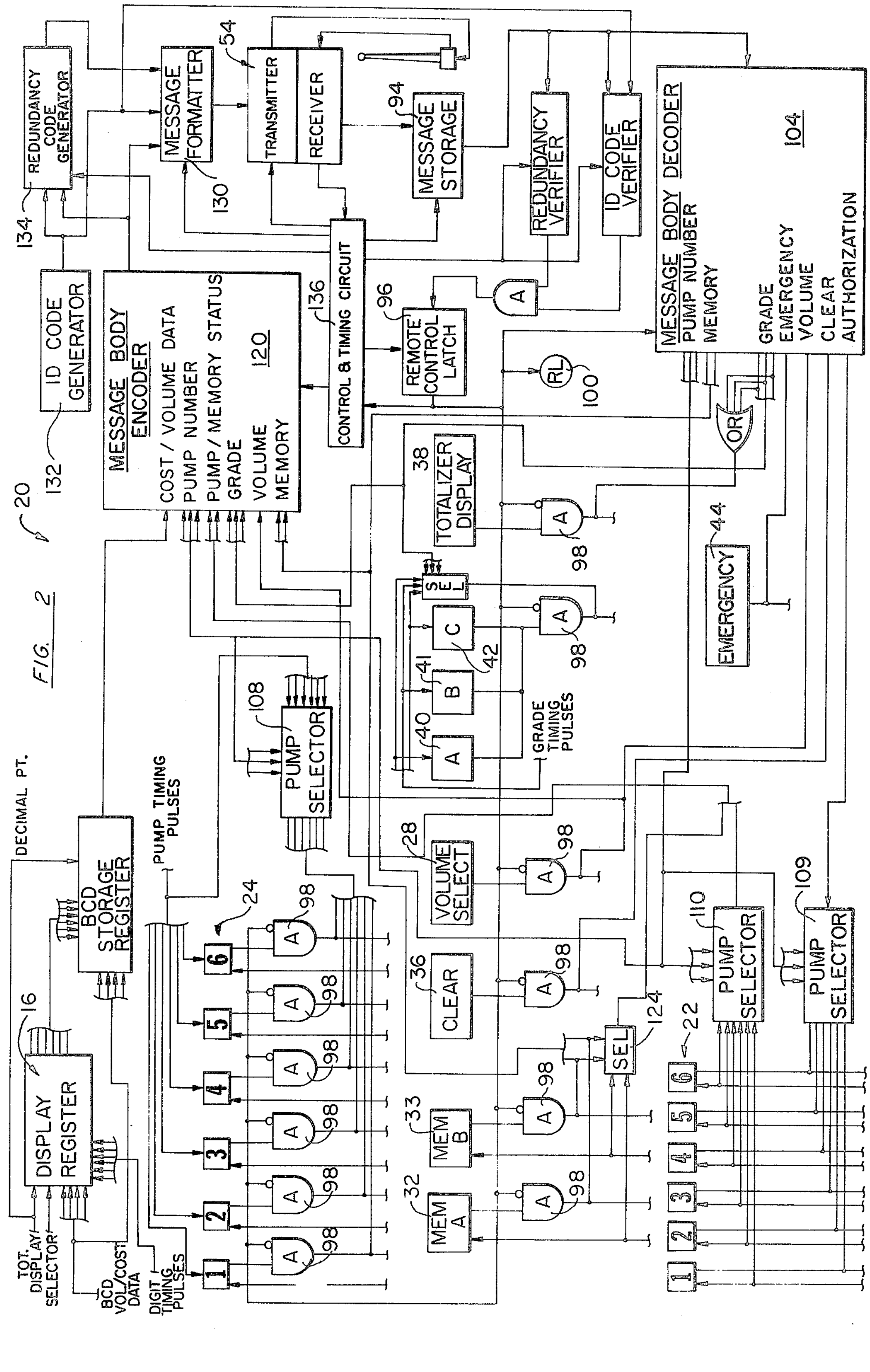
FIG. 2 is a partial diagrammatic view, partly broken away, of a fixed station module of the fuel delivery control and registration system.
Figure 3:
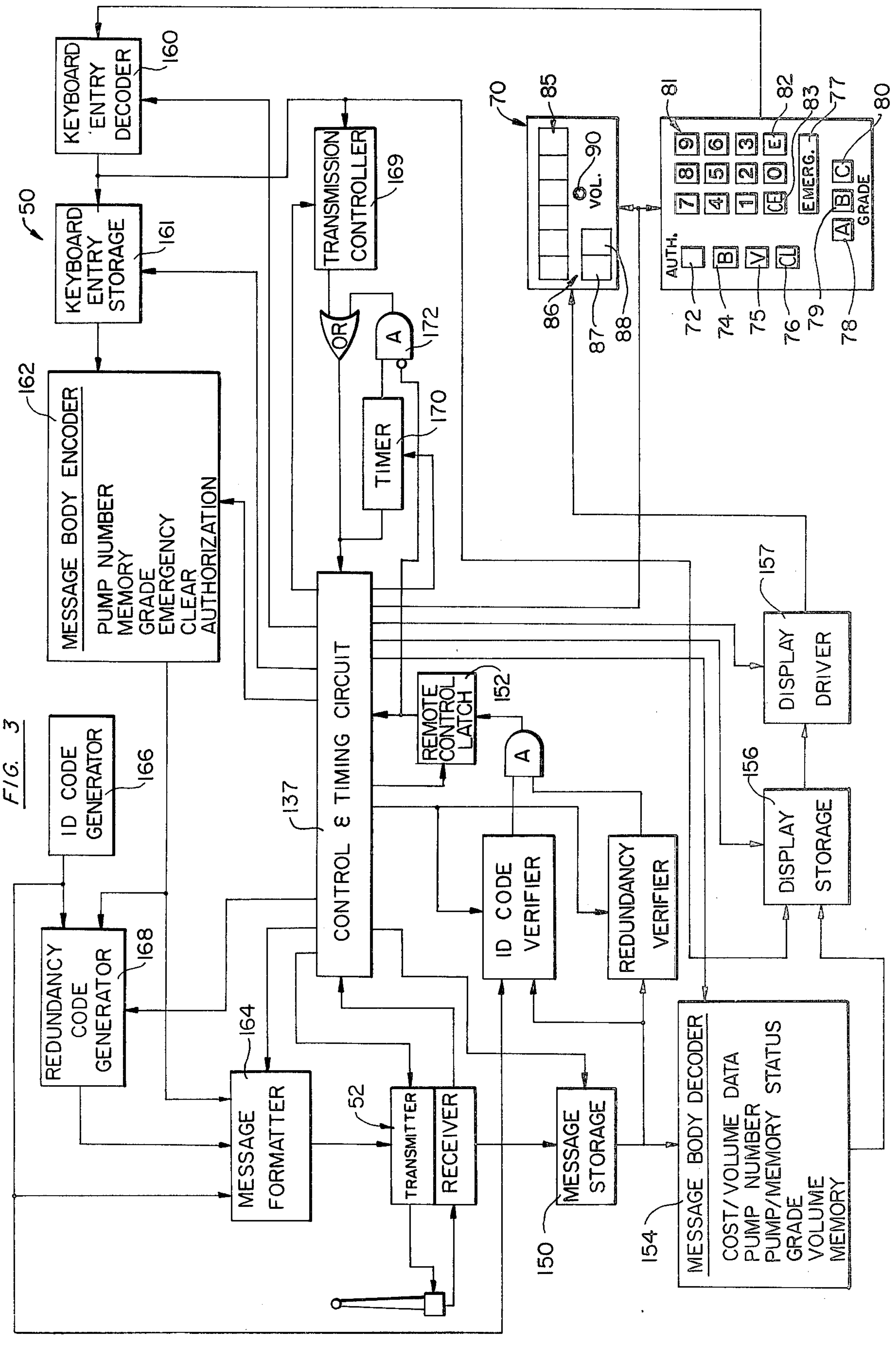
FIG. 3 is a diagrammatic view of a portable station module of the fuel delivery control and registration system.

Referring to FIG. 2, each message received by the transmitter/receiver 54 of the fixed or central station module 20 is temporarily stored in a suitable message storage device 94 for verifying or authenticating the message identification and redundancy codes. A remote control latch 96 is then operated to momentarily switch the postpay console 18 to its remote control mode for processing the incoming message and transmitting a reply message back to the portable module 50. The remote control latch 96 is connected via gates 98 to disconnect all of the manual push button switches of the fixed console 18 except the emergency push button switch 44 and bank 22 of pump authorization switches 22. The remote control latch 96 is also connected (a) to energize a suitable signal lamp 100 to indicate that the postpay console 18 is operating in its remote control mode and (b) to operate a message decoder 104 which decodes the body of the message entered into the storage device 94 and converts it to useful operating signals for operating the postpay console 18 in the manner of its manual push button switches. Thus, to the extent provided in the body of the message received from the portable module 50, pump number, memory, grade, emergency, volume, clear and authorization select signals are generated for operating the postpay console 18. Any pump select signal provides (a) for selecting the desired pump via a pump selector 108; (b) for connecting any authorization signal for affecting pump authorization via a pump selector 109; and (c) for transmitting any authorization feedback signal of the selected pump via a pump selector 110. Any memory select signal affects memory selection in place of the memory push button switches 32, 33 and any grade select signal affects grade selection in place of the grade push button switches 40–42 and totalizer push button switch 38. Any emergency, volume or clear signal is effective in the manner of the push button switches 44, 28, 36 respectively. Any authorization signal provides for authorizing the selected pump via the pump selector 109.

A message body encoder 120 is provided for encoding the postpay console readout data transmitted to the postpay display register 16 and the status of any selected pump memory. Also, the encoder 120 provides for reencoding for feedback verification by the portable module 50 any pump number, memory, grade and volume control signals generated by the decoder 104. The postpay console readout data (including a decimal point signal which locates the decimal point at one or two decimal places) is first entered into a suitable intermediate BCD storage register 122 and then transferred to the encoder 120. The pump memory status is transmitted to the encoder 120 via the pump selector 110 and a memory selector 124.

The encoded message is transferred from the encoder 120 to a message formatter 130 along with an identification code received from an identification code generator 132 and a redundancy code received from a redundancy code generator 134 to format a reply message for transmission by the transmitter/receiver 54 back to the portable module 50. The entire process from initial receipt of the identification code of an incoming message by the transmitter/receiver 54 to the transmission of a reply message is performed electronically at high speed in a fraction of a second. The control and timing circuit 136 is synchronized initially by the preamble code of the incoming message to control the sequence and operational timing of the various functions. If an incoming message identification code and/or redundancy code is incorrect, the received unauthenticated message is erased without switching the postpay console 18 to its remote control mode.

Referring now to FIG. 3, each message received by the transceiver 52 of the portable station module 50 is temporarily stored in a suitable message storage device 150 for verifying or authenticating the message identification and redundancy codes. A remote control latch 152 is then operated to switch the portable module 50 for processing the incoming information message. The remote control latch 152 is connected via the control and timing circuit 137 to operate a message decoder 154 which decodes the body of the message entered into the storage device 150 and converts it to useful display register operating signals which are stored in a display storage register 156. The display storage register 156 is connected to the display register 70 via a suitable display driver 157 for operating the register components 85, 86 and 90 in accordance with the message information received. Thus, to the extent provided in the body of the feedback information message received from the fixed station module 20, the display register 70 is operated to display any selected pump/memory or grade, the status of any selected pump/memory, and the total fuel volume or cost amount of any selected pump memory or grade and indicate with the volume indicator 90 if a volume amount is being displayed.

The portable module keyboard is operable for transmitting a control message to the fixed station module 20 via a keyboard entry decoder 160, a keyboard entry storage device 161 and a suitable encoder 162 provided for encoding the keyboard message. Also, the keyboard decoder 160 is preferably connected to the display storage register 156 to display the selected pump, grade, etc. entered by the keyboard to enable the operator to verify the keyboard entry before it is transmitted by pressing the entry select push button switch 82.

The encoded message is transferred from the encoder 162 to a message formatter 164 along with an identification code received from an identification code generator 166 and a redundancy code received from a redundancy code generator 168 to format a control message for transmission by the transceiver 52 to the fixed station transceiver 54. The control message is transmitted to the fixed control station 93 upon receipt of an entry signal by a transmission controller 169 (when the entry push button switch 82 is operated).

If a feedback information message is not in the process of being received by the portable module transceiver 52 within a predetermined interval (e.g., $\frac{1}{4}$ second) after the completion of the transmission of a control message by the portable module 50, a timer 170 generates a transmission repeat signal to retransmit the control message. Preferably, the timer 170 is operable to repeat the transmission, for example, up to five times until an authenticated message is received. The remote control latch 152 is connected to an AND gate 172 to disconnect the timer 170 when an authenticated message is received.

The control and timing circuit 137 is synchronized initially by the preamble code of the incoming feedback information message to control the sequence and operational timing of the various functions of the portable module circuit. If an incoming message identification and/or redundancy code is incorrect, the received unauthenticated message is erased without storing the message in the display storage register 156.

As will be apparent to persons skilled in the art, various modifications, adaptations and variations of the foregoing specific disclosure can be made without departing from the teachings of the present invention.

We claim:

1. In a hybrid fuel delivery system having a plurality of separate self-service and attendant operated fuel delivery dispensers for self-service and attendant operated delivereies of fuel respectively and a fuel delivery registration and control system having a first fixed station control system electrically connected to each self-service dispenser and comprising first register means selectively operable for registering the amount of fuel delivered from each self-service dispenser and first control means with a first set of manually operable switches and selectively manually operable thereby to selectively activate each self-service dispenser for self-service delivery of fuel and selectively operate the first register means to register the amount of fuel delivered from each self-service dispenser, the improvement wherein the fuel delivery registration and control system further comprises a second portable station control system having second register means selectively operable for registering the amount of fuel delivered from each self-service dispenser and second control means with a second set of manually operable switches and selectively manually operable thereby to selectively remotely operate the fixed station control means, in place of said first set of switches, to selectively activate each self-service dispenser for self-service delivery of fuel and selectively remotely feedback operate the portable station register means via the portable station control means to register the amount of fuel delivered from each self-service dispenser, and wherein the fixed station control means and portable station control means have respective compatible wireless transceiver interface means for transmitting a control message from the portable station control means in accordance with said manual operation of said second set of switches for said remote operation of the fixed station control means and for transmitting a feedback information message from the fixed station control means for said feedback operation of the portable station register means.

2. In a fuel delivery registration and control system for a fuel delivery system having a plurality of self-service fuel delivery dispensers for self-service deliveries of fuel respectively, the fuel delivery registration and control system having a first fixed station control system adapted to be electrically connected to each self-service dispenser and comprising first register means selectively operable for registering the amount of fuel delivered from each self-service dispenser and first control means with a first set of manually operable switches manually operable thereby to selectively activate each self-service dispenser for self-service delivery of fuel and selectively operate the first register means to register the amount of fuel delivered from each self-service dispenser, the improvement wherein the fuel delivery registration and control system further comprises a second remote station control system having second register means selectively operable for registering the amount of fuel delivered from each self-service dispenser and second control means with a second set of manually operable switches and selectively manually operable thereby to selectively remotely operate said fixed station control means, in place of said first set of switches, to selectively activate each self-service dispenser for self-service delivery of fuel; wherein said fixed station control means selectively remotely operates said remote station register means, via said remote station control means and in accordance with said selective manual operation of the second set of switches, to selectively register the amount of fuel delivered from each self-service dispenser; and wherein said fixed station control means and said remote station control means have respective compatible interface means for transmitting a control message from said remote station control means for said remote operation of said fixed station control means and for transmitting an information message from said fixed station control means for said remote operation of said remote station register means.

3. A system according to claim 1 or 2 wherein the second station register means is operable to identify each self-service dispenser, and wherein said remote operation of the second station register means includes remote operation thereof to identify the self-service dispenser from which the amount registered by the second station register means was delivered.

4. A system according to claim 1 or 2 wherein the fixed station control means has alternative local and remote modes of operation by said first and second sets of manually operable switches respectively, and wherein said second station control means is manually operable by said second set of switches for said selective remote operation of the fixed station control means in its remote mode of operation.

5. A system according to claim 1 or 2 wherein said second station control means is manually operable by predetermined manual operation of said second set of switches to transmit a serial coded control message via its interface means to the interface means of the fixed station control means for said remote operation of the fixed station control means, and wherein said fixed station control means is automatically operable to transmit a serial coded information message via its interface means to the interface means of the second station control means for said remote operation of the second station register means only after receipt of a said coded control message and upon said remote operation thereby of the fixed station control means.

6. A hybrid fuel delivery system according to claim 1 wherein the portable station control means consists of a hand size module.

7. A system according to claim 1 wherein the fixed station control means comprises authenticating means for authenticating a message received by the fixed station transceiver interface means as being a control message transmitted from the portable station interface means.

8. A system according to claim 1 wherein the portable station control means automatically repeats transmission of a said control message if a said feedback information message is not received from the fixed station control means after a predetermined short interval.

* * * * *